(12) United States Patent
Long

(10) Patent No.: US 6,771,209 B1
(45) Date of Patent: Aug. 3, 2004

(54) AUTOMATIC RADAR TARGET DETECTOR

(76) Inventor: Maurice Wayne Long, 1036 Somerset Dr., NW., Atlanta, GA (US) 30327

( * ) Notice: Subject to any disclaimer, the term of this patent is extended or adjusted under 35 U.S.C. 154(b) by 0 days.

(21) Appl. No.: 10/235,348

(22) Filed: Sep. 6, 2002

(51) Int. Cl.[7] .............................................. G01S 13/52
(52) U.S. Cl. ....................................................... 342/93
(58) Field of Search ............................ 342/91, 92, 93, 342/94, 159, 160

(56) References Cited

U.S. PATENT DOCUMENTS

| | | | | |
|---|---|---|---|---|
| 4,684,950 A | * | 8/1987 | Long | 342/94 |
| 5,485,157 A | * | 1/1996 | Long | 342/93 |
| 5,644,315 A | * | 7/1997 | Long | 342/93 |
| 5,781,149 A | * | 7/1998 | Long | 342/160 |

FOREIGN PATENT DOCUMENTS

JP         11281731        * 10/1999   ........... G01S/13/90

* cited by examiner

*Primary Examiner*—Daniel Pihulic

(57) ABSTRACT

The invention provides improved target detection and clutter rejection, and is applicable to pulse radars operating a mixed clutter and noise environment. It employs a signal amplitude expandor that functions in operative association with a constant false alarm rate (CFAR) processor. Because of the statistical nature of noise and clutter, the invention adapts to the target and interference environment simultaneously by two independent processes: the average signal strength and the statistical characteristics of noise and clutter.

13 Claims, 3 Drawing Sheets

AUTOMATIC RADAR TARGET DETECTOR

BACKGROUND OF THE INVENTION

This invention relates to methods of and circuits for suppressing clutter and noise for automatic target detection radars. Radar clutter signals are unwanted echo signals caused, e.g., by rain, land, or sea. Clutter signal amplitude depends on radar range and direction, and is statistically distributed over a wide range of amplitudes as a function of radar range and azimuth. Noise signals, on the other hand, are unwanted signals having random fluctuations also with a wide range of amplitudes. Common sources of noise include internally generated receiver noise and jamming interference from external sources. Unlike clutter echo, noise at the receiver output occurs at all radar ranges.

Automatic detection radars use an interference thresholding circuit called CFAR (constant false alarm rate). A CFAR establishes threshold levels at a plurality of radar resolution cells to automatically reject clutter and noise (see, e.g., M. I. Skolnik, *Introduction to Radar Systems*, $3^{rd}$ Edition, McGraw-Hill, 2001, pp. 295–298). Then, a signal larger than the threshold is assumed to be due to a target and one below the threshold is assumed to be caused by either the noise and/or clutter. The most commonly used CFAR is the range CFAR. A range CFAR sets a threshold level at each range cell based on sampling the strength of a received signal in neighboring range cells. To accomplish this, the CFAR obtains an aggregate (usually an average) of the strengths of the radar signal sampled at neighboring range cells, and based on the aggregate's magnitude it sets a threshold. Then for each range cell, a target signal is provided as output if its magnitude exceeds the threshold at said each range cell; otherwise the CFAR output is zero.

Experience shows that the target detection capability of CFAR processing is degraded when it is required to operate in scenarios that require rejecting a variety of clutter types and noise. This is because the amplitude statistics of noise and clutter are dramatically different, and the statistics of clutter differ significantly with differences in the physical features of rain, land and sea. The present invention provides an effective way to maintain a sensitive target detection capability and yet effectively control false alarms caused by noise and clutter. This is done whether targets are in the presence of noise, clutter, or a mixture of the two.

The input to a CFAR is supplied from a unipolar detector output. Traditionally, the amplitude of received signals has been obtained with crystal diode detectors or demodulators. Also, the I, Q detector is commonly used, especially in MTI and pulse Doppler radars. The amplitude of a received echo signal which is input to a radar receiver that provides I and Q signals is proportional to $(I^2+Q^2)^{1/2}$, where I and Q are the in-phase and quadrature signals (see, e.g., M. 1. Skolnik, *Introduction to Radar Systems*, $3^{rd}$ Edition, McGraw-Hill, 2001, pp. 288–290). To minimize requirements on processor dynamic range, some radars use just the I and Q magnitudes to approximate $(I^2+Q^2)^{1/2}$, thereby avoiding the increased dynamic range caused by squaring. The present invention is applicable to improving detection performance and suppressing noise and clutter when using any of the above mentioned detectors or any other detector that provides a unipolar signal.

SUMMARY OF THE INVENTION

The invention is applicable to improving the detection sensitivity of automatic target detection radar and to the automatic suppression of noise and clutter. It improves detection and interference suppression by adaptively establishing a threshold for detecting targets and for rejecting noise and clutter, based on two factors: (1) the mean or another aggregate strength of interfering noise and clutter located within resolution cells near a target's resolution cell, and (2) the statistical distribution of said noise and clutter. As explained in material that follows, the invention employs an amplitude expandor that functions in operative association with a CFAR device. As a consequence, the CFAR threshold level is adaptively established to maximize target detection sensitivity by establishing a desired threshold level consistent with both the strength of and the statistical characteristics of the interfering noise and clutter.

The objects of the invention are to provide circuits and methods that:

(1) Will improve the target detection sensitivity and the capabilities for suppressing noise and clutter (2) Will provide an improved method for automatic detection of targets in the presence of noise and clutter, comprising a signal expandor that functions in operative association with a CFAR device (3) Will provide a noise and clutter threshold that responds to the strength of noise and clutter and to the statistical nature of said interference, and to respond to said strength and statistical nature independently of one another.

(4) Will provide an improved automatic target detection and interference suppression capability through use of a relatively simple expandor device that can be readily implemented with digital processing technology and which can function in operative association with commonly used CFAR technology.

This invention will process unipolar radar signals, and including signals obtained with traditional crystal diode detectors or demodulators, and with I, Q detectors that are used in MTI and pulse doppler radar. Therefore the objects of the invention are also to provide circuits and methods that:

(5) Can be used with a MTI or a pulse Doppler radar that uses MTI cancellers, and (6) Can be used with a MTI or a pulse Doppler radar using a plurality of doppler filters.

To accomplish these objects, the invention includes an amplitude expandor means that functions in operative association with a CFAR device. Use of an amplitude expandor for expanding the amplitude range of the signals before being input to a CFAR emphasizes the stronger amplitude components of the interference. In this way, the mean of the noise and/or clutter interference at the CFAR is raised differently depending on the statistics of the interference. Thus, the more spiky clutter (higher percentage of strong echoes), which requires a higher threshold relative to its average signal strength for rejecting its spikes (peaks in signal strength), inherently creates the needed adaptive rejection mechanism. Therefore the expandor/CFAR combination is an efficient method for detecting targets, and yet it can effectively reject the prevailing noise and/or clutter. In other words, because of the different statistical features of noise and clutter, the expandor/CFAR combination adapts to the target and interference environment simultaneously by two independent processes: the average strength and the statistical characteristics of nearby interference.

DESCRIPTION OF TVI DRAWINGS

DETAILED DESCRIPTION OF THE PREFERRED EMBODIMENTS

Figure 1:
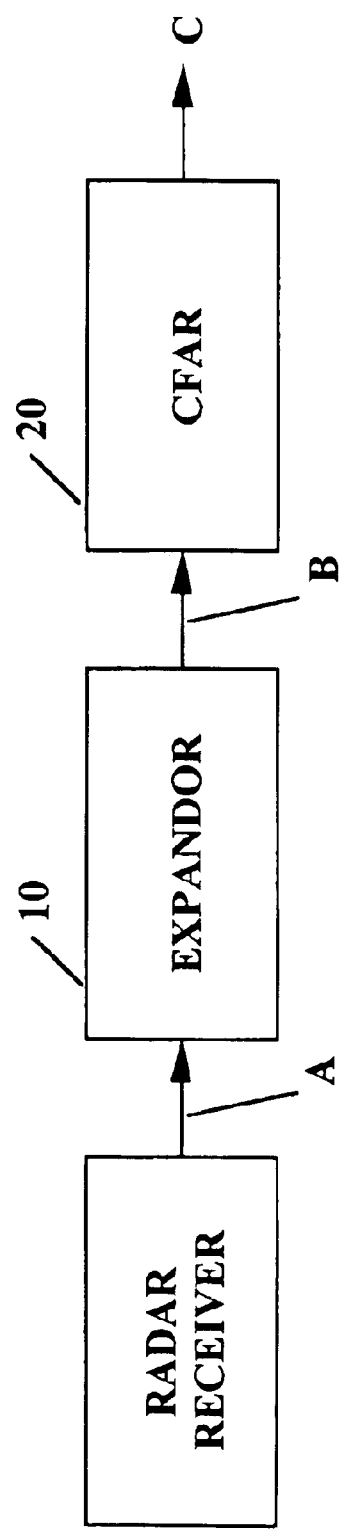
FIG. 1 is a block diagram of an embodiment of the automatic radar target detector of the present invention that employs a signal expandor functioning in operative association with a CFAR.

FIG. 1 illustrates the principal features of the invention. A radar receiver provides received signal A. Signal A is supplied as input to an expandor, block 10, and its output, signal B, is supplied as input to a CFAR, block 20. Upon processing signal B, block 20 provides output signal C. Expandor block 10 expands the amplitude of signal A and provides signal B, which has expanded amplitude. As will be shown, its mean (i.e., average) is a function of its amplitude probability distribution. CFAR, block 20 contains thresholding circuitry that performs as follows: if signal B exceeds the CFAR threshold, its output signal C is gated on to indicate the presence of a target; otherwise it is gated off to reject clutter and noise. It is to be recognized that block 10 is continuously expanding signal A and providing signal B. Also, block 20 is continuously responding to signal B, which as already noted is continuously responding to signal A. For a pulse radar, signal A varies with time corresponding to radar range. Thus, accordingly, expanded signal B also varies with time corresponding to radar range, and the processing by block 20 makes separate thresholding decisions for each range.

Now described is the method by which the expandor, block 10, effects. Block 10 comprises computational circuitry that can substantially increase the magnitude of larger amplitude signals. As will be further discussed, the amplitude expansion by the expandor increases the mean of those signals having high percentage of large amplitude signals relative to the mean of signals having lesser percentages.

Weibull statistics are used below for illustrating the process of generating a mean level for signal B based on the statistical amplitude distribution of signal A. As shown in the literature, clutter and noise amplitude statistics are usually well described by Weibull statistics (M. W. Long, *Radar Reflectivity of Land and Sea*, 3$^{rd}$ Edition, Artech House, 2001, sec. 5.2.3, and J. B. Billingsley, *Low-Angle Radar Land Clutter*, SciTech Publishing, 2002, sec. 2.4). Noise is the special Weibull statistic having Weibull parameter a=1. Variations having a higher percentage of large amplitudes have larger values of parameter a. For example, Weibull, a=5, is descriptive of very spiky ground clutter. Sometimes other statistical distributions, such as the K and lognormal, are observed from measurements. Even so, the concepts introduced herein are applicable to such other statistical distributions.

For brevity, we let A denote the time varying amplitude of signal A. Then, the amplitude of signal A versus time (or radar range) is represented simply by the symbol A. Thus, for noise and/or clutter, amplitude A versus radar range can be reasonably well replicated with Weibull statistics. By raising signal A to a power N, with N greater than unity, provides an effective and a relatively simple computer algorithm for the expandor, block 10. N need not be an integer. If desired, other functional relationships can be used as an expandor algorithm. Another example of an expanding functional is $e^{fA}-1$, where f is positive.

As discussed briefly under BACKGROUND OF THE INVENTION, the signal $(I^2+Q^2)^{1/2}$ is proportional to the amplitude of the signal received by a radar receiver, where I and Q are the in-phase and quadrature signals. For simplification in mathematical analysis, published calculations for a CFAR are commonly made for the case of processing the signal $(I^2+Q^2)$, which is proportional to amplitude squared and thus proportional to power. Although the theoretical analyses are difficult, it is known that for target detection in noise, the ratio of signal-power to noise-power required for target detection of a given detection probability differs insignificantly—whether linear, i.e., $(I^2+Q^2)^{1/2}$, or square-law, i.e., $(I^2+Q^2)$ response to the received signal is used. However, the preferred radar receiver response has been linear, which is $(I^2+Q^2)^{1/2}$ when expressed in terms of I and Q signals (see, e.g., M. I. Skolnik, *Introduction to Radar Systems*, 3$^{rd}$ Edition, McGraw-Hill, 2001, p. 288). A major reason for preferring linear instead of square law response is that the range of amplitudes (dynamic range) is smaller for linear response, thereby necessitating fewer restraints on the characteristics of equipment that follows the detection process. In the case of the I and Q signals being digitized, an advantage of smaller dynamic range is that the signal amplitudes are more easily handled with digital processing that uses less expensive and readily available fixed point arithmetic. Today, however, fast digital processing hardware is available for using floating-point arithmetic which, in a practical sense for radar, does not limit the range of amplitudes (dynamic range) that can be processed.

Radar receivers often provide I and Q signals separately as outputs (Skolnik, op. cit., FIG. 5.3, p. 289). For MTI and pulse Doppler radars, these signals are filtered for suppressing clutter. These signals can be processed to create a signal of amplitude $A^2$. To provide this amplitude expansion of a signal of amplitude A, signals I and Q are each squared and are added for providing the amplitude expanded signal, i.e., $(I^2+Q^2)$ Therefore, by processing separate I and Q receiver outputs, the amplitude expanded signal having amplitude $A^2$ can be provided as signal B input to CFAR, block 20. Thus, the aforementioned I and Q processing effects the algorithm for expandor 10 of FIG. 1.

The table that follows includes results of numerically calculating the means of A, $A^2$, $A^3$, and $A^4$ for several Weibull distributions, where A is amplitude. For simplification, each distribution was chosen so that its mean $A^2$ is unity (i.e., average power fixed). Notice that with increases in Weibull parameter "a" (i.e., increases in clutter spikyness), mean A decreases and both mean $A^3$ and mean $A^4$ increase. Also, for a given distribution, mean AN increases with increases in N. As now discussed, these changes in the means cause significant changes in target detection performance.

| Weibull parameter of variate A | Mean A | Mean $A^2$ | Mean $A^3$ | Mean $A^4$ |
| --- | --- | --- | --- | --- |
| a = 1, b = 1.0 | 0.89 | 1 | 1.3 | 2.0 |
| a = 2.5, b = 0.4 | 0.62 | 1 | 2.7 | 10.6 |
| a = 4.0, b = 0.25 | 0.41 | 1 | 7.6 | 151 |
| a = 5.0, b = 0.2 | 0.31 | 1 | 11.2 | 234 |

False alarm rates depend on the expandor (block 10) algorithm, in addition to the clutter statistics, per se. This is because (1) the algorithm of block 10 changes the statistics of signal A to that of signal B which is input to the CFAR, block 20, and (2) the mean level of signal B, which depends on its statistics, controls the threshold level within block 20. In other words, for signal A having amplitude A and comprised of noise and/or clutter, the means of the amplitudes of signal B ($A^2$, $A^3$, $A^4$, etc.) are each different, and not directly proportional to their respective exponents 2, 3, 4, etc. Thus, for clutter and noise, the threshold level for CFAR, block 20, when referred back to the receiver output depends on the statistics of signal A and on the expandor coefficient N. Therefore, for the more spiky clutter for which high threshold levels are required for effectively rejecting clutter, the threshold is raised by its statistics. Similarly, where only a lower threshold is needed, e.g., where only noise is present, the threshold is automatically lower because of the statistics of noise. On the other hand, for a target signal A, mean $A^N$=(mean $A)^N$, and thus the expandor does not change the threshold level for a target when referred back to the receiver output.

In summary, the expandor (block 10) expands the amplitude of signal A, for providing signal B having expanded amplitude. A preferred algorithm is of the form $A^N$, where N>1. For example, computer simulations using values of N of 2 up to 8 have proved successful, with the higher values of N providing the best target detection sensitivities for scenarios that include spiky clutter. The larger N values involve greater computational complexity, but modem signal processors can rapidly make these computations.

Figure 2:
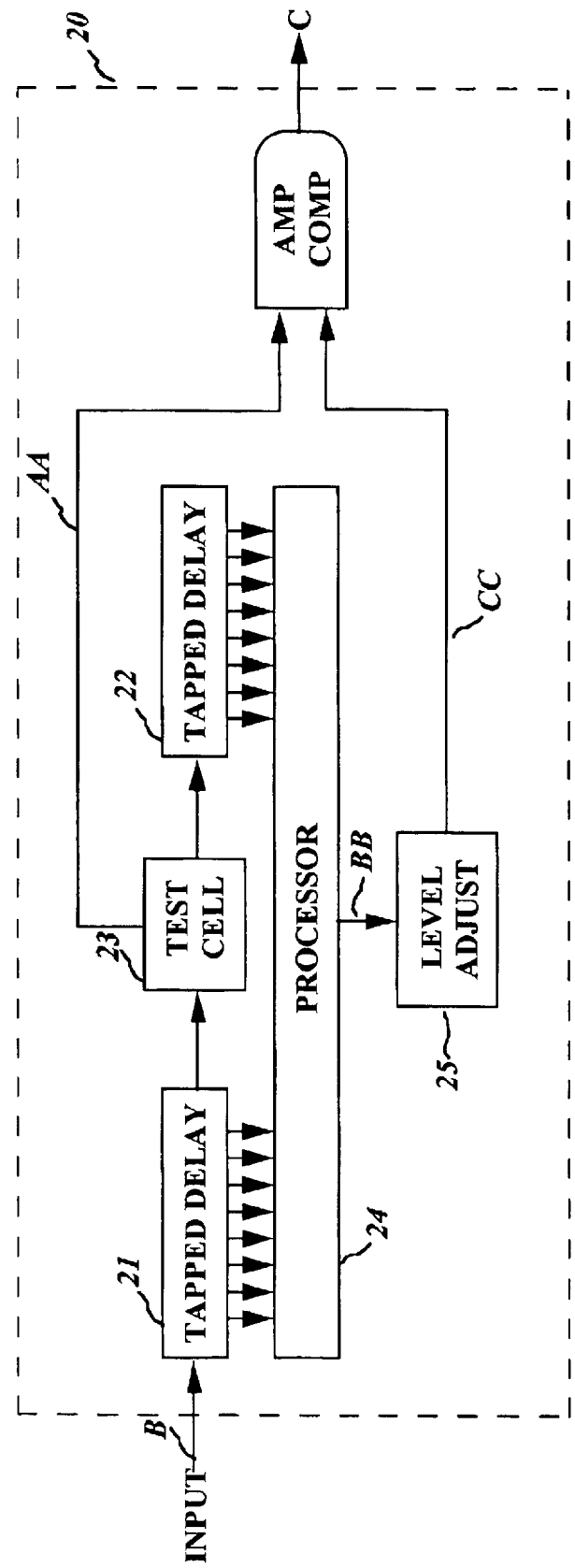
FIG. 2 is a block diagram showing the principal features of a cell-averaging CFAR.

FIG. 2 illustrates a CFAR that utilizes tapped delay lines, blocks 21 and 22, that sample the CFAR input signal B. Following conventional practice (see, e.g., M. I. Skolnik, *Introductions to Radar Systems*, $3^{rd}$ Edition, McGraw-Hill, 2001, p. 295), these delay lines are used to sample the CFAR input signal at range cells on either side of each range cell of interest by means of the test cell, block 23. This test cell provides signal AA as output and, in accordance with conventional range CFAR techniques, it can be positioned in range over the plurality of ranges corresponding to the instrumented radar range. Spacing between the taps is equal to the separation of range cells, i.e., the range resolution, and the outputs of the taps are processed by the processor, block 24, to obtain an aggregate, signal BB. The aggregate when multiplied by the level adjuster, block 25, provides CFAR reference signal CC. Then, CFAR output signal C is provided by amplitude comparator (AMP COWP) only at a test range cell where CFAR signal AA exceeds the CFAR reference signal CC; said reference signal magnitude at a range cell being above the average, i.e., mean, of the CFAR input signal at the neighboring range cells within the windows of ranges sampled by delay lines 21 and 22.

Figure 3:
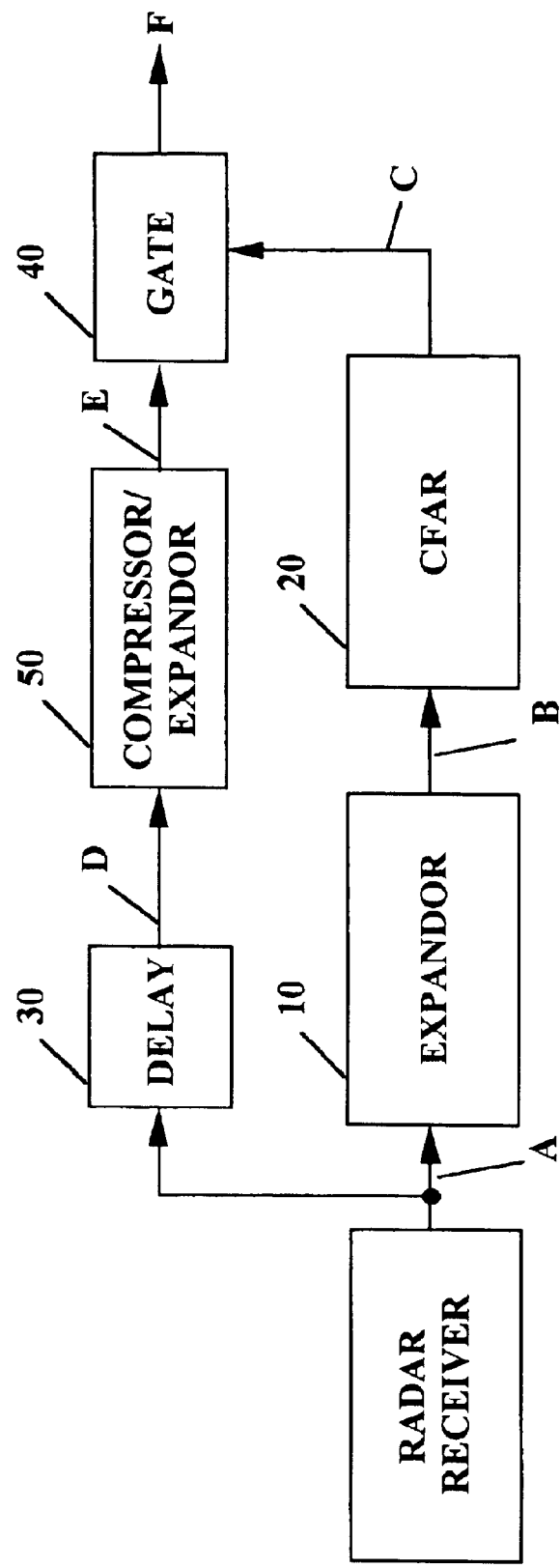
FIG. 3 is a block diagram of an alternate embodiment of the automatic radar target detector of the present invention that employs a signal expandor functioning in operative association with a CFAR.

FIG. 3 includes a radar receiver, expandor (block 10), and CFAR (block 20) as in FIG. 1. In addition, delay (block 30), gate (block 40), and a compressor/expandor (block 50) are added. Blocks 10 and 20 function as described in connection with FIG. 1. However, in FIG. 3 the output signal C of block 20, signal C, can activate gate (block 40) for providing signal E as output signal F. Signal E is derived from signal A by means of block 30 and by compressor/expandor, block 50. Block 30 provides signal D by delaying signal A, so that signals E and F are at the radar range corresponding to the comparator output signal C. Compressor/expandor, block 50, is included as an option for possible use. It permits tailoring the range of amplitudes of signal E and output signal F. For example, given that the amplitude of signals A and D are represented as A, the radar designer may wish the amplitude range of signals E and F to be compressed (e.g., to $A^{1/2}$ by the square-root function) or expanded (e.g., to $A^N$, where N is greater than unity). Sometimes radar displays or other analog equipment that may follow the digital processing have practical limits on the dynamic ranges of their inputs. Then, the processed digital signals could be compressed in amplitude range by use of the compressor/ expandor, block 50.

In summary, FIG. 3 is an embodiment of the invention for which the comparator output signal C of block 20 can activate gate, block 40, and this gate would then output signal F, with signal F having amplitude in response to signal A and constituting a clutter suppressed output signal.

What is claimed is:

1. An automatic radar target detector for improving the detection of radar targets in the presence of noise and clutter, comprising:

radar receiver means for providing a first signal, amplitude expandor means for providing a first amplitude expanded signal in response to said first signal, said first amplitude expanded signal having amplitude expanded in range beyond the amplitudes of said first signal, means of sampling said first amplitude expanded signal at a plurality of radar resolution cells for providing a plurality of amplitude expanded signals, means of summing said plurality of amplitude expanded signals for providing a summed signal means of sampling said first amplitude expanded signal at a resolution cell for providing an amplitude expanded test signal, said amplitude expanded test signal not located at a resolution cell of said a plurality of resolution cells of said plurality of amplitude expanded signals, means of providing a threshold signal having amplitude that varies in response to said summed signal, comparator means for comparing said test signal with said threshold signal and providing a comparator output signal for indicating the presence of a radar target signal when the amplitude of the amplitude expanded test signal exceeds that of the threshold signal.

2. An automatic radar target detector according to claim 1, wherein said first amplitude expanded signal having amplitude $A^N$, where N is greater than unity, and the amplitude A is the amplitude of said first signal.

3. An automatic radar target detector according to claim 1, comprising means of providing an output signal with amplitude in proportion to said first signal, and wherein the comparator output signal activates a gate which thereby outputs said output signal, said output signal constituting a clutter suppressed output signal.

4. An automatic radar target detector according to claim 1, comprising means of providing an output signal with amplitude compressed in relationship to said first signal, and wherein the comparator output signal activates a gate which thereby outputs said output signal, said output signal constituting a clutter suppressed output signal having amplitude compressed in relation to said first signal.

5. An automatic radar target detector according to claim 1, comprising means of providing an output signal with amplitude expanded in relationship to said first signal, and wherein the comparator output signal activates a gate which thereby outputs said output signal, said output signal constituting a clutter suppressed output signal having amplitude expanded in relationship to said first signal.

6. An automatic radar target detector according to claim 1, wherein said radar receiver means comprising I and Q signals, means for squaring said I and said Q signals, and means for summing said squared I and Q signals for providing said first signal.

7. An automatic radar target detector according to claim 1, wherein said radar receiver means providing I and Q output signals, and said amplitude expandor means comprising means for squaring said I and said Q signals and means for summing said squared I and Q signals for providing said first amplitude expanded signal.

8. An automatic target detector for improving the detection of radar targets in the presence of noise and clutter, comprising:

radar receiver means for providing a first signal, expandor means for providing first amplitude expanded signal in response to said first signal, said first amplitude expanded signal having amplitude expanded in range beyond the amplitudes of said first signal, CFAR processor means for processing said first amplitude expanded signal by accepting said expanded signal as input and providing a noise and clutter suppressed output.

9. A method of automatic detection and noise and clutter suppression, comprising the steps of:

providing a received signal with amplitude in response to the amplitude of radar received echo signals, providing a signal with expanded amplitude in response to the amplitude of the received signal, providing samples of said signal with expanded amplitude at a plurality of radar resolution cells, summing the samples of said signal with expanded amplitude at a plurality of resolution cells and providing a summed signal sampling the signal with expanded amplitude at a resolution cell for providing an amplitude expanded test signal, the resolution cell of said amplitude expanded test signal not located at a resolution cell of the samples of said signal with expanded amplitude that provide the summed signal, providing a threshold signal having amplitude that varies in response to said summed signal, comparing said test signal with said threshold signal and providing a comparator output for indicating the presence of a radar target signal when the amplitude of the test signal exceeds that of the threshold signal.

10. A method of automatic detection and noise and clutter suppression according to claim 9, wherein said step of providing a signal with expanded amplitude includes raising the amplitude of received signal with amplitude A to a power N, where N exceeds unity.

11. A method of automatic detection and noise and clutter suppression according to claim 9, comprising the steps of providing an output signal with amplitude in proportion to the amplitude of said received signal, activating said output signal with the presence of the comparator output signal for providing a clutter suppressed output signal with amplitude in proportion to the amplitude of said received signal.

12. A method of automatic detection and noise and clutter suppression according to claim 9, comprising the steps of providing an output signal with amplitude compressed in relationship to the amplitude of said received signal activating said output signal with the presence of the comparator output signal for providing a clutter suppressed output signal with amplitude compressed in relationship to the amplitude of said received signal.

13. A method of automatic detection and noise and clutter suppression according to claim 9 comprising the steps of providing an output signal with amplitude expanded in relationship to the amplitude of said received signal activating said output signal with the presence of the comparator output signal for providing a clutter suppressed output signal with amplitude expanded in relationship to the amplitude of said received signal.

* * * * *